United States Patent Office 2,919,225
Patented Dec. 29, 1959

2,919,225

TOXIC NITRILES

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,477

20 Claims. (Cl. 167—30)

This invention relates to toxic nitriles, and more particularly provides methods for the control of the growth of microorganisms and certain novel compositions comprising sulfur-containing nitriles which are highly toxic to microorganisms such as bacteria and fungi.

In one aspect, this invention concerns the reaction of halogenated aromatic sulfenyl halides with olefinic nitriles to produce novel compositions of matter having extraordinary potency as microbiological toxicants.

It has been reported in the literature (Kharasch and Buess, J. Am. Chem. Soc. vol. 71, p. 2726, first column (1949)) that although 2,4-dinitrobenzenesulfenyl halides add readily to various classes of olefinic compounds, this addition does not take place with an $\alpha,\beta$-olefinic nitrile such as acrylonitrile. Turner and Connor, J. Am. Chem. Soc. (1947) 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our experiments with a nitrobenzenesulfenyl chloride and acrylonitrile have confirmed this finding. Furthermore, although perchloromethyl mercaptan (trichloromethanesulfenyl chloride) is known to add rapidly to the double bond of a variety of olefins we have not been able to cause a reaction of this sulfenyl halide with acrylonitrile.

It is accordingly unexpected that, as now reported, a halogenated aromatic sulfenyl halide is found to react readily with acrylonitrile.

The products of this reaction are complex mixtures. As illustrative of one of the present reaction products, there may be considered the product of reaction of p-chlorobenzenesulfenyl chloride with acrylonitrile. When this reaction product is oxidized with hydrogen peroxide, there is formed 2-chloro-3-(4-chlorophenylsulfonyl)propionitrile, in about 30% yield calculated on the total amount of reaction product oxidized. This sulfone is identified as identical with the sulfone prepared by base catalyzed addition of p-chlorothiophenol to $\alpha$-chloroacrylonitrile to produce 2-chloro-3-(4-chlorophenylthio)propionitrile, which is then oxidized with hydrogen peroxide to the sulfone. Now, that this beta-sulfonyl nitrile should be isolated from the present reaction product is surprising, since when acrylonitrile forms adducts with any of a variety of other materials, such as hydrogen chloride, hydrogen sulfide, ammonia, amines, etc., the negatively charged portion of the addend, e.g. Cl⁻, adds to the beta carbon atom of the acrylonitrile. Thus, it would have been expected that the product of addition of a sulfenyl chloride to acrylonitrile would give a $\beta$-chloro-$\alpha$-thio nitrile. Yet, the sulfone isolated from oxidation of the reaction mixture of this sulfenyl chloride with acrylonitrile is an $\alpha$-chloro-$\beta$-sulfonyl compound. This indicates that either rearrangement of the original reaction product occurs during the oxidation to the sulfone, which is unlikely judging from other experiments wherein oxidation to the sulfone has been proved not to cause rearrangement, or else addition in the reverse of the expected sense takes place, at least in part, during the reaction of the sulfenyl halide with the acrylonitrile.

It is to be noted that only about one-third of the reaction product of p-chlorobenzenesulfenyl chloride with acrylonitrile can be isolated as the above-mentioned sulfone after oxidation. Additional evidence of the composition of the total reaction mixture can be obtained from the infrared spectrum of the product. This spectrum shows marked absorption by the nitrile group, and the nitrile absorption band is a doublet. The fact that the nitrile band is sharp and marked is of significance: it is known that a chlorine atom on the carbon atom alpha to a nitrile group interferes with nitrile absorption in the infrared spectrum and largely suppresses such absorption. Thus, absorption by the nitrile band is strong in the spectrum of acetonitrile but is only weak in that of chloracetonitrile. The strong absorption of the nitrile band in the spectrum of the reaction product of p-chlorobenzenesulfenyl chloride and acrylonitrile accordingly indicates that the product contains substantial amounts of a material which does not contain a chloro substituent on the carbon atom alpha to the nitrile group. Furthermore, it is noted above that the nitrile absorption band is a doublet. From the strength of the absorption, in each portion of this doublet, it may be deduced that approximately equal amounts of two different kinds of strongly absorbing nitrile compounds are present in the reaction mixture. The indications are consonant with the hypothesis that the reaction mixture contains an unsaturated nitrile, this producing a slightly displaced nitrile absorption band, due to the conjugation between olefinic unsaturation and nitrile unsaturation, as well as the aforesaid saturated nitrile wherein no chlorine atom is present on the carbon atom alpha to the nitrile group. All of these data, together with the information which is known about sulfenyl halide adducts, are congruent with the theory that the reaction product of p-chlorobenzenesulfenyl chloride and acrylonitrile contains a mixture of 3-chloro - 2 - (4 - chlorophenylthio)propionitrile and 2-chloro-3-(4-chlorophenylthio)propionitrile, together with 3-(4-chlorophenylthio)acrylonitrile and/or 2 - (4 - chlorophenylthio)acrylonitrile. It is to be noted that although ready dehydrochlorination of an $\alpha$-chloropropionitrile is unlikely, 3 - (4 - chlorophenylthio)acrylonitrile could be formed directly in the course of the present reaction, via a reaction mechanism calling for a cyclic sulfonium intermediate reaction product of the 4-chlorophenylthio cation with acrylonitrile, followed by deprotonation, as has been postulated by Kharasch for certain sulfenyl halide reactions.

In view of the uncertain composition of the present reaction mixture, however, while we conceive the composition to be as described above, we prefer not to be bound by such hypothesis, but to claim the reaction product per se, whatever the actual composition.

This invention also contemplates the reaction of halo-substituted aromatic sulfenyl halides with other $\alpha,\beta$-olefinic nitriles. We have found that aromatic sulfenyl halides add to 3-substituted acrylonitriles more sluggishly than to acrylonitrile itself, in agreement with the known fact that vinylidene compounds containing a terminal =CH$_2$ group are more reactive than those in which the olefinic double bond is attached to substituents replacing hydrogen on either side of the double bond. However, experiments with compounds such as cinnamonitrile, wherein the beta carbon atom of acrylonitrile is substituted by a hydrocarbon radical, indicate that the reaction proceeds in essentially the same direction as with acrylonitrile.

On the other hand, when the alpha carbon atom of an $\alpha,\beta$-olefinic nitrile contains a substituent replacing hydrogen, e.g., when there is employed an acrylonitrile homolog such as methacrylonitrile, the reaction with a sulfenyl halide appears to proceed differently than with α,β-olefinic nitriles wherein the carbon atom adjacent to the nitrile radical is substituted only by a hydrogen atom. Unexpectedly, the product of reaction of a benzenesulfenyl chloride with methacrylonitrile appears to be a single compound. Actually, of course, this product must be a racemic mixture of optical isomers, since addition of a sulfenyl halide to the double bond of methacrylonitrile, whatever the mode of addition, must produce a product containing an asymmetric carbon atom. Optical isomers having the same physical properties, however, are inseparable by ordinary techniques and the present racemic mixtures behave as individual compounds. These products from α-substituted α,β-olefinic nitriles and aromatic sulfenyl halides contain no unsaturated product; the nitrile absorption in the infrared spectrum is a single bond and not a doublet. The nitrile absorption is marked, which would indicate that the product does not contain an α-chloro atom. Therefore, this reaction product, e.g., the p-chlorobenzensulfenyl chloride and methacrylonitrile adduct, is believed to be 3-chloro-2-(4-chlorophenylthio)-2-methylpropionitrile:

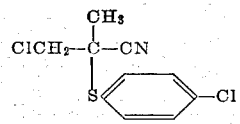

However, the possibility of the presence of the isomeric 2-chloro-3-(4-chlorophenylthio)-2-methylpropionitrile

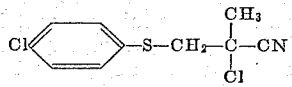

has not been excluded.

As pointed out above, the α-substituted olefinic nitriles differ from the olefinic nitriles containing hydrogen as the sole substituent on the alpha carbon atom, in that the product of reaction with aromatic sulfenyl halides is in one case a mixture of nitriles, and in the other case, apparently a single compound. We have found that there is a further difference between the products obtained. The products of reaction of α-substituted acrylonitriles with aromatic sulfenyl halides possess biological toxicant activity: at a concentration of 0.1% in a medium ordinarily supporting bacterial and fungal growth, they inhibit the growth of microorganisms. The complex reaction product obtained by reaction of acrylonitrile with aromatic sulfenyl halides, particularly certain sulfenyl halides as further defined herein below, however, is an extraordinarily active microbiological toxicant, being far more potent than the products of reaction of α-substituted acrylonitriles with aromatic sulfenyl halides or than a number of other related compounds. Whereas various other substituted propionitriles and also reaction products of aromatic sulfenyl halides with olefinic nitriles are effective in suppressing bacterial and fungal growth at concentrations on the order of 0.1%, the present reaction products from acrylonitrile and benzenesulfenyl chlorides wherein the benzene ring is substituted by from 1 to 3 chlorine atoms are unique, in that they are able to control microbiological organism growth at concentrations on the order of one thousandth of this concentration, i.e., down to 1 part per million. These especially effective reaction products are also active against both gram negative and gram positive bacteria, which is an unusual property, as well as against sulfate reducing bacteria, which are ordinarily resistant to most of the known bactericides. Furthermore, the microbiological toxicant activity remains effective in the presence of soap, which in many cases acts to reduce or eliminate the activity of bactericidal agents.

As indicated above, the reaction product of a halogenated aromatic sulfenyl halide with an α-hydrocarbylacrylonitrile such as methacrylonitrile appears to be a 3-halo-2-(haloarylthio)-2-methylpropionitrile and/or 2-halo-3-(haloarylthio)-2-methylpropionitrile. These haloarylthio-substituted haloalkanenitriles may be represented by the general formula

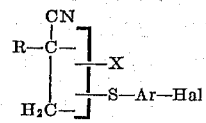

where R represents a hydrocarbon radical, X represents halogen, and Hal-Ar-S represents a haloarylthio radical, the bracketed structure being used to indicate that X and Hal-Ar-S radicals are attached alternatively to the α or the β carbon atoms.

So far as we are aware, haloarylthio-substituted haloalkanenitriles of the above formula have not been known hitherto.

By the present invention of the reaction of an α-hydrocarbyl-acrylonitrile with a halogenated aromatic sulfenyl halide, there are provided the compounds of the above formula where R is a hydrocarbon radical.

It forms a further aspect of this invention to provide compounds of the above general formula where R represents hydrogen. Such compounds are believed to be present in the reaction product of acrylonitrile with halogenated aromatic sulfenyl halides, but there are contradictory features in the attempted structure proof outlined below which render the composition of the reaction mixture unproved. However, alternative methods are available whereby the present haloarylthio-substituted halopropionitriles may be obtained. For the synthesis of 2-halo-3-(haloarylthio)propionitriles, two different syntheses have been found effective: addition of a halogenated aromatic thiol to an α-haloacrylonitrile; and reaction of an alkali salt of a halogenated aromatic thiol with an α,β-dihalopropionitrile, displacement of halogen occurring at the beta position. The 3-halo-2-(haloarylthio)propionitriles are available by pyrolytic dehydrohalogenation of the 2-halo-3-(haloarylthio)propionitriles, which is accompanied by rearrangement, to give 2-(haloarylthio)acrylonitriles. Addition of a hydrogen halide to the 2-(haloarylthio)acrylonitrile gives a 3-halo-2-(haloaylthio) propionitrile.

The presently provided haloarylthio haloalkanenitriles of the general formula

and

particularly when X represents chlorine and Hal-Ar- represents a mono-, di-, or trichlorophenyl radical appear to have pronounced toxicity to bacteria and fungi.

Thus, in one aspect this invention pertains to the reaction of a halogenated aromatic sulfenyl halide with an α,β-olefinic nitrile; this reaction being employed for the conversion of α-hydrocarbyl-substituted olefinic nitriles to certain novel chemical compounds; and being employed with an α,β-olefinic nitrile free of alpha hydrocarbon substituents to obtain complex reaction products of unusual properties.

In another aspect, this invention relates to the compounds obtained by reaction of α-hydrocarbyl-substituted olefinic nitriles with a halogenated aromatic sulfenyl halide, these products being of utility as chemical intermediates and as toxicants.

In another aspect, this invention concerns the complex reaction products of acrylonitrile and β-substituted acrylonitriles with halogenated aromatic sulfenyl halides, these products having utility as biological toxicants and for other purposes.

An additional embodiment of the present invention is the provision of 3-halo-2-(haloarylthio)propionitriles and 2-halo-3-(haloarylthio)propionitriles as new compounds.

Another object of the present invention is the utilization of the reaction product of acrylonitrile with halo-substituted aromatic sulfenyl halides, and particularly chlorobenzenesulfenyl chlorides containing from 1 to 3 chloro substituents on the benzene ring, as bactericides and as fungicides.

It forms a further part of this invention to use components, saturated or unsaturated, of the reaction product of acrylonitrile with halo-substituted aromatic sulfenyl halides as bactericides and fungicides.

This invention additionally sets forth the concept of utilizing an α-halo-β-(halophenylthio)propionitrile or a β-halo-α-(halophenylthio)propionitrile, and particularly those wherein each halo-substituent is chlorine and from 1 to 3 chlorine atoms are present in the benzene ring, as bactericides and as fungicides.

The olefinic nitriles presently useful for reaction with sulfenyl halides in accordance with this invention are of the general formula

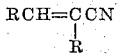

where each R represents hydrogen or a hydrocarbon radical free of aliphatic unsaturation and containing 1–6 carbon atoms, provided that at least one R represents hydrogen.

Acrylonitrile is the preferred olefinic nitrile employed in the practice of this invention to produce complex reaction products. The β-hydrocarbyl-substituted acrylonitriles react more slowly than acrylonitrile, in conformity with the general greater reactivity of a terminal olefinic bond as compared to an olefinic bond within a chain of carbon atoms. Exemplary of β-substituted acrylonitriles which may be employed in the practice of the invention are olefinic nitriles having the structure of acrylonitrile substituted in the beta position by a hydrocarbon radical of 1–6 carbon atoms, e.g., crotononitrile, isocrotononitrile, 2-hexenenitrile, cinnamonitrile, 3-cyclopentylacrylonitrile, 3-cyclohexylacrylonitrile, etc. It will be appreciated that, whereas acrylonitrile is preferred in the present invention for the production of the presently afforded extraordinarily active microbiological toxicant compositions, the other α,β-olefinic nitriles which are β-substituted, as listed above, may be used in the practice of the process of the invention advantageously for such purposes as the production of reaction mixtures having valuable properties per se, e.g., as dielectrics, and as a source of chemical intermediates, e.g., of olefinic polymerizable monomers, as well as having biological toxicant properties.

As mentioned above, methacrylonitrile may be employed in the process of the invention employing halogenated aromatic sulfenyl halides to produce what we conceive to be racemic mixtures of optical isomers of chemical compounds which are 3-halo-2-(haloarylthio)-2-methylpropionitriles and/or 2-halo-3-(haloarylthio)-2-methylpropionitriles. This process may also be operated with α-substituted α,β-olefinic nitriles terminating in a methylene group and wherein the alpha substituent is a hydrocarbon radical containing more than 1 carbon atom. Preferably, such hydrocarbon radical contains 1–6 carbon atoms, and is free of aliphatic unsaturation, compounds of this type being 2-methylenebutyronitrile, 2-methylenecapronitrile, 2-methyleneheptanonitrile, 4,4-dimethyl-2-methylenevaleronitrile, 2-phenylacrylonitrile, 2-cyclohexylacrylonitrile, etc.

The preferred halo-substituted aromatic sulfenyl halide for the practice of this invention is chlorobenzenesulfenyl chloride, particularly p-chlorobenzenesulfenyl chloride.

It has been found that, as the chlorine substitution on the phenyl radical increases, up to pentachlorobenzenesulfenyl chloride, the microbiological toxicity of the reaction products resulting from reaction of the sulfenyl halides with acrylonitrile decreases. Accordingly, for the practice of the process of the invention to obtain highly effective microbiological toxicant compositions, it is prefererd to employ chlorobenzenesulfenyl chlorides wherein the benzene radical is substituted by from 1 to 3 chlorine radicals. However, it will be appreciated that more highly substituted halogenated benzenesulfenyl halides can be employed in the practice of the invention either with acrylonitrile or with α- or β-substituted acrylonitriles to produce products having utility for various purposes, e.g., as dielectrics, as well as possessing toxicant activity.

The presently useful halogenated aromatic sulfenyl halides in the broad process of this invention may be characterized generaly as sulfenyl halides wherein the sulfenyl halide is attached directly to a nuclear carbon atom of the aromatic radical, and the aromatic radical contains up to two benzene rings. As used herein the term "aromatic" denotes a compound containing a benzene nucleus which may be attached to or fused with another benzene ring and which may be substituted by alkyl radicals. While chlorine is the preferred halogen substituent in the halogenated aromatic sulfenyl halide used in the process of the invention, it is also possible to employ bromo or iodo substituents either on the aromatic radical or in the sulfenyl halide portion of the molecule as substitutes for chlorine; the halogen fluorine is generally less reactive and is not preferred in the present process as the sulfenyl halide radical halogen, but may be present on the aromatic radical of the present halogenated aromatic sulfenyl halides. Examples of presently useful benzenesulfenyl chlorides substituted by from 1 to 3 chlorine atoms are 2-, 3-, and 4-chlorobenzenesulfenyl chloride, 2,4-, 3,4-, 2,5-, 3,5- and 2,6-dichlorobenzenesulfenyl chloride, 2,4,5- and 2,4,6-trichlorobenzenesulfenyl chloride, etc. Other halogenated benzenesulfenyl halides which may be employed in the process of this invention include 4-bromobenzenesulfenyl chloride, 4-iodobenzenesulfenyl chloride, 4-fluorobenzenesulfenyl chloride, 4-bromobenzenesulfenyl bromide, 3-bromo-4-chlorobenzenesulfenyl chloride, 4-chlorobenzenesulfenyl iodide, pentachlorobenzenesulfenyl chloride, 5-chloronaphthalenesulfenyl chloride, 5,8-dichloronaphthalenesulfenyl chloride, 4-chlorobiphenylsulfenyl chloride, etc.

There may also be employed in the process of the invention other halogenated aromatic sulfenyl halides such as alkaryl sulfenyl chlorides, e.g., 3-chloro-4-methylbenzenesulfenyl chloride, 2-chloro-4-methylbenzenesulfenyl chloride, 2,4-dichloro-3-methylbenzenesulfenyl chloride, 3,4-dichloro-6-methylbenzenesulfenyl chloride, 2-chloro-4-isopropylbenzenesulfenyl chloride, 2,3-dimethyl-4-chlorobenzenesulfenyl chloride, 3-chloro-4-t-butylbenzenesulfenyl chloride, 3,5-dichloro-4-neopentylbenzenesulfenyl chloride, etc.; and further, haloalkylaryl sulfenyl halides, e.g., chloromethylbenzenesulfenyl chloride, trichloromethylbenzenzenesulfenyl chloride, 3-chloro-4-chloromethylbenzenesulfenyl chloride, 3,5-dichloro-4-trichloromethylbenzenesulfenyl chloride, 2,3-bis(chloromethyl)-4-chlorobenzenesulfenyl chloride, 2,4-bis(α-chloroethyl) benzenesulfenyl chloride, 4-(chloropropyl)benzenesulfenyl chloride, 4-(chloropentyl) benzenesulfenyl chloride, etc.

We presently consider that the products of reaction of halogenated aromatic sulfenyl halides with methacrylonitrile and other α-hydrocarbyl-substituted acrylonitriles are products which may be characterized as 3(2)-halo-2(3) - (haloarylthio) - 2 - methylpropionitriles, whereby this nomenclature is meant a 3-halo-3-(haloarylthio)-2-methylpropionitrile and/or 2-halo-3-(haloarylthio)-2-methylpropionitrile, and claim these compounds as new.

These novel compounds provided by the process of this invention which are the reaction products of methacrylonitrile with halogenated aromatic sulfenyl halides include, e.g., 3(2) - chloro-2(3) - (2-chlorophenylthio)-2-methylpropionitrile, 3(2)-chloro-2(3)-(3,4 - dichlorophenylthio)-2-methylpropionitrile, 3(2)-iodo-2(3)-(3,4-dichlorophenylthio)-2-methylpropionitrile, 3(2)-bromo-2(3) - (2,4-dibromophenylthio) - 2 - methylpropionitrile, 3(2)-chloro - 2(3) - (2,4,5 - trichlorophenylthio) - 2 - methylpropionitrile, 3(2) - chloro-2(3) - (pentachlorophenylthio)-2-methylpropionitrile, 3(2)-chloro-2(3)-(iodophenylthio)-2-methylpropionitrile, 3(2)-chloro-2(3)-(4-fluorophenylthio)-2-methylpropionitrile, 3(2)-chloro-2(3)-(2-chloro-4-ethylphenylthio)-2-methylpropionitrile, 3(2)-chloro-2(3)-(4-chloromethylphenylthio) - 2-methylpropionitrile, 3(2)-chloro-2(3)-(5-chloronaphthylthio)-2-methylpropionitrile, etc. When there is employed a higher homolog of methacrylonitrile such as 2-methylenebutyronitrile, there are obtained in accordance with this invention compounds such as 3(2)-chloro-2(3)-(2,4-dichlorophenylthio)-2-pentylpropionitrile, 3(2)-chloro-2(3)-(4-bromophenylthio) - 2 - hexylpropionitrile, 3(2)-chloro-2(3)-(4 - fluorophenylthio) - 2 - isopropylpropionitrile, 3(2-chloro-2(3)-(pentachlorophenylthio) - 2-neopentylpropionitrile, etc. Alternatively to 2-alkyl-substituted acrylonitriles, there may be employed in the present reaction 2-aryl- or 2-cycloalkyl-substituted acrylonitriles such as 2-phenylacrylonitrile or 2-cyclohexylacrylonitrile, giving such products as 3(2)-chloro-2(3)-(4-chlorophenylthio)-2-phenylpropionitrile, 3(2)-chloro-2(3)-(2,4,5 - trichlorophenylthio) - 2 - phenylpropionitrile, 3(2)-chloro - 2(3) - (3-chlorophenylthio)-2-cyclohexylpropionitrile, etc.

It has been pointed out above that the reaction product of acrylonitrile or of β-substituted acrylonitriles with the presently useful aromatic sulfenyl halides is a reaction product containing unsaturated thio-substituted nitriles. These unsaturated nitriles may amount to about ⅓ by weight of the aforesaid reaction product, and the proportion of unsaturated nitriles in the reaction product is increased in exposure of the reaction product to heat, as in distillation. Either an α- or a β-(haloarylthio) acrylonitrile may be formed. The β-(haloarylthio) acrylonitriles can occur in the mixture in both of the possible geometrical isomer forms, i.e., the cis or the trans. These compounds are of interest, for example, as olefinic monomers useful for the synthesis of polymers of utility for forming films, fibers, etc., and as biological toxicants, e.g., for the control of the growth of bacteria and fungi. Thus, the present reaction also affords a means of obtaining such (haloarylthio)acrylonitriles, as (2-chlorophenylthio)acrylonitrile, (3-chlorophenylthio)acrylonitrile, (4-chlorophenylthio)acrylonitrile, (4-bromophenylthio)acrylonitrile, (2,4 - dichlorophenylthio)acrylonitrile, (2,4,5 - trichlorophenylthio)acrylonitrile, (pentachlorophenylthio)acrylonitrile, (2-chloro-4 - bromophenylthio)acrylonitrile, (2-iodophenylthio)acrylonitrile, (4-fluorophenylthio)acrylonitrile, (2,3 - bischloromethylphenylthio)acrylonitrile, (3-chloro-4-amylphenylthio)acrylonitrile, (5-chloronaphthylthio)acrylonitrile, etc.

The new products provided by this invention by the reaction of sulfenyl halides with nitriles vary in properties from liquids to solid materials, and from stable materials to volatile or readily polymerizable, sensitive compounds, depending on the starting materials. They may be considered as falling into two classes:

(1) The complex reaction products of acrylonitrile and β-substituted acrylonitriles with halogenated aromatic sulfenyl halides; and
(2) The compounds obtained by reaction of methacrylonitrile and similar α-hydrocarbyl-substituted acrylonitriles with halogenated aromatic sulfenyl halides.

The first of these products are extremely valuable microbiological toxicants when there is employed for their synthesis acrylonitrile and a benzenesulfenyl chloride wherein from 1 to 3 chlorine atoms are present on the benzene ring. Useful compounds are also obtained by the reaction of acrylonitrile or β-hydrocarbyl-substituted acrylonitriles with these or other halogenated aromatic sulfenyl halides, the complex reaction mixtures obtained thereby being suitable as sources of olefinic monomers, as dielectrics, as biological toxicants, e.g., herbicides, plant fungicides, bactericides, etc., and for other purposes.

When the nitrile employed in the process of the invention is an α-hydrocarbyl-substituted acrylonitrile, then the present process gives compounds which can be used per se as biological toxicants; e.g., for the control of bacteria such as *M. pyogenes,* or may be useful for intermediates for chemical synthesis, e.g., the reactive halogen atom in such compounds can be replaced by other functional groups such as phosphonyl radicals, to produce parasiticidal compounds.

The process of the invention whereby sulfenyl halide reaction products are obtained involves contacting approximately equimolecular amounts of a halogenated aromatic sulfenyl halide with acrylonitrile or an α- or β-hydrocarbyl-substituted acrylonitrile. If desired, an excess of the more readily available component may be present in the reaction mixture to serve, e.g., as a reaction diluent. The reaction appears to consume approximately equimolecular amounts of each reactant and when an excess of either component is used, it generally can be recovered unchanged at the close of the reaction. The rapidity of reaction varies greatly, depending on the reactants chosen, some reactions being exothermic and requiring solvents and/or diluents to moderate the violence of the reaction, while others do not reach completion until after a period of refluxing at elevated temperatures. Suitable inert solvents and diluents which may be employed in the reaction mixture, if desired, include hydrocarbons such as benzene, halogenated solvents such as carbon tetrachloride, oxygenated solvents free of active hydrogen such as ether, etc. A particularly preferred class of solvents are anhydrous organic carboxylic acids and especially glacial acetic acid, since this solvent also has the advantage of acting as a catalyst for the reaction. Mixtures of glacial acetic acid and an inert solvent such as ethylene dichloride may also be used as a reaction medium, if desired.

The use of catalysts is not necessary, but may be advantageous under some circumstances. Exemplary of acid catalysts which may be used in the present reaction, besides glacial acetic acid as mentioned above, are, e.g., Friedel-Crafts catalysts such as aluminum chloride, boron trifluoride complexes, etc. Pressure variation may also be utilized to facilitate the conduct of the reaction, e.g., when the reaction is carried out in a pressure resistant vessel under autogenous pressure and elevated temperatures are employed.

Since unsaturated nitriles and especially acrylonitrile are susceptible to thermal polymerization, the reaction is preferably conducted in the presence of polymerization inhibitors. Examples of suitable polymerization inhibitors are, e.g., hydroquinone, hydroquinone monomethyl ether, methylene blue, copper carbonate, selenium dioxide, etc.

The time required to accomplish the reaction and form the presently afforded reaction products depends on functional factors such as the reactivity of the α,β-olefinic nitrile and the sulfenyl halide, the temperature of reaction, the presence or absence of catalysts, etc. Reaction rates and times of reaction may vary considerably, depending on details of apparatus and other operational conditions. By modifications of the apparatus, continuous procedures may be substituted for the batch-type operations described below.

As indication of the progress of the reaction is a color change in the reaction mixture; generally, sulfenyl halides are a deep red color and the reaction mixture lightens as the sulfenyl halide is consumed. On completion of the reaction, conventional methods such as filtration, decantation, and evaporation may be employed to separate the products. In the case of the reaction products of α-hydrocarbyl-substituted acrylonitriles such as methacrylonitrile, procedures such as distillation or extraction may serve to isolate the individual products. When the complex reaction products from acrylonitrile or 3-substituted acrylonitriles with aromatic sulfenyl halides are being worked up, it is to be noted that elevated temperatures employed during distillation appear to promote dehydrohalogenation of the products. Thus, if it is desired to obtain olefinic compounds from the reaction products of acrylonitrile with halogenated aromatic sulfenyl halides, distillation or heating, preferably in the presence of hydrogen chloride acceptors, facilitates the production of such unsaturated products. On the other hand, if it is desired to avoid, insofar as possible, any dehydrohalogenation of the reaction product, the reaction products may be prepared by contacting essentially equimolecular amounts of nitrile and sulfenyl halide, or the excess unreacted component of the reaction mixture may be distilled off, the reaction product being obtained as residue.

The details of modes of procedure in accordance with this invention are illustrated by the following non-limiting examples:

*Example 1*

A mixture of 35.8 g. (0.2 mole) of p-chlorobenzenesulfenyl chloride and 10.6 g. (0.2 mole) of acrylonitrile in 100 ml. of glacial acetic acid was refluxed for 2 hours; the color of the mixture turned from red to yellow in the first 15 minutes of reflux. After standing overnight at room temperature, the reaction mixture was poured into 500 ml. of water to give a cloudy, viscous orange oil. The oil was extracted with a mixture of equal volumes of benzene and hexane and the extract was washed with water until it was free of acid. Then the organic solution was distilled. After removal of solvent, there were obtained 27.7 g. of a yellow viscous liquid product, $n_D^{25}$ 1.5914, b. 180–190° C./15 mm.

*Example 2*

In a repetition of the above experiment, a mixture of 89.5 g. of p-chlorobenzenesulfenyl chloride and 26.5 g. (0.5 mole) of acrylonitrile in 200 ml. of glacial acetic acid was refluxed for 15 minutes and then cooled and distilled. Seventy-five grams of a fraction boiling over the interval of from 115° to 170° C./0.8–1.0 mm. ($n_D^{25}$ 1.5950) was collected and combined with the product from Example 1. Redistillation of the combined products gave 83 g. of the complex reaction product as a yellow liquid, $n_D^{25}$ 1.5944, b. 140–146° C./0.5 mm., the elemental analysis of which corresponded very closely to that calculated for $C_9H_7Cl_2NS$.

*Example 3*

Similarly, by addition of 79.5 g. (1.5 mole) of acrylonitrile to 134 g. (0.75 mole) of p-chlorobenzenesulfenyl chloride in 300 ml. of glacial acetic acid, followed by heating to reflux for 1 hour, there were obtained 82.5 g. of product, b. 150–153° C./0.6 mm.

*Example 4*

In another run, 374 g. (2.09 moles) of p-chlorobenzene-sulfenyl chloride was reacted with 159 g. (3 moles) of acrylonitrile in 300 ml. of dry benzene, 100 ml. of glacial acetic acid being added to catalyze the completion of the reaction after the reaction mixture had been refluxed for several hours. Evolution of hydrogen chloride was noted during the reaction. There were obtained 231 g. of product boiling at 170° C./2 mm.

*Example 5*

The structure proof that the adduct of acrylonitrile and p-chlorobenzenesulfenyl chloride contains 2-chloro-3-(4-chlorophenylthio)propionitrile or else a material that is converted to this isomeric form during oxidation to the corresponding sulfone is outlined below:

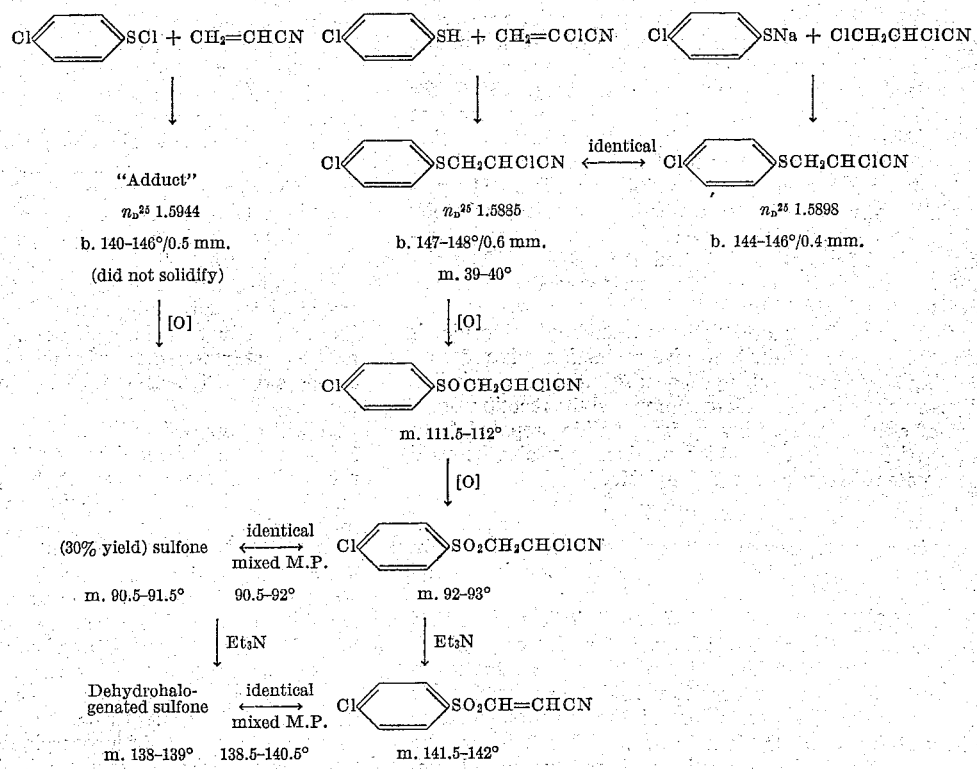

It is significant that, in repeated attempts to oxidize the p-chlorobenzenesulfenyl chloride-acrylonitrile adduct, it has never been possible to obtain more than about a 30% yield of the sulfone. This would not appear to be due to difficult oxidizability of a sulfur atom alpha to a nitrile group, for lactonitrile has been converted to 2-chloropropionitrile, and reacted with sodium chlorothiophenate to obtain 2-(4-chlorophenylthio)propionitrile, m. 45–47°, which was readily oxidized to the corresponding sulfone, melting, in agreement with the literature value, at 100 101.5° C. That this is not the beta sulfonyl compound is proved by the nonidentity of this product with that prepared from the oxidation of the adduct of p-chlorothiophenol with acrylonitrile, which melts at 93–94°. If the adduct of p-chlorobenzenesulfenyl chloride and acrylonitrile were a mixture of 2-chloro-3-(chlorophenylthio)propionitrile and 3-chloro-2-(chlorophenylthio)-propionitrile, therefore, it would be expected that each of the isomers would be oxidized to the sulfone. However, when forcing conditions are attempted, dehydrohalogenation of the sulfone occurs and up to almost 20% yield of the (chlorophenylsulfonyl)acrylonitrile was obtained.

It is to be noted that the refractive index of the adduct is significantly different from that of the product of addition of p-chlorothiophenol to α-chloracrylonitrile, thus indicating the presence of a material having a refractive index different from that of 2-chloro-3-(4-chlorophenylthio)propionitrile in the reaction mixture of the sulfenyl chloride and acrylonitrile. Our conclusion from the various data which we have obtained is that the reaction product of chlorobenzenesulfenyl chloride with acrylonitrile probably consists of a mixture consisting primarily of 3-chloro-2-(chlorophenylthio)propionitrile and 2-chloro-3-(chlorophenylthio)propionitrile, together with 3- and/or 2-(chlorophenylthio)acrylonitrile, but that this explanation does not account completely and satisfactorily for all of the behavior of the reaction mixture.

Example 6

A mixture of 31.6 g. (0.1 mole) of pentachlorobenzenesulfenyl chloride with 200 ml. of glacial acetic acid was heated until complete solution was obtained at 110° C. Then 26.5 g. (0.5 mole) of acrylonitrile were added slowly to the reaction mixture, whereupon the occurrence of reaction was evidenced by the changing color of the reaction mixture which lightened from dark orange to pale yellow. The mixture was held at about 100° C. for 30 minutes and then cooled and filtered. After most of the glacial acetic acid had been distilled off, the reaction mixture was poured into a beaker of water and stirred, whereupon a light tan solid precipitate settled. The precipitate was filtered off, washed, and dried, whereby there were obtained 27.8 g. of product. A sample recrystallized from ethanol melted at 92–94° C. The elemental analysis of the product corresponded to that calculated for $C_9H_3Cl_6NS$.

Similarly, 4-chloromethylbenzenesulfenyl chloride is reacted with acrylonitrile to give a reaction mixture containing chloromethylphenylthio-substituted propionitriles. By similar procedures, there is prepared the reaction product of acrylonitrile with a sulfenyl halide prepared from 1,2,4-trichlorobenzene, which product may also be used as a potent bactericide and fungicide.

Example 7

This example describes the reaction of a beta-substituted acrylonitrile with a halogenated aromatic sulfenyl halide.

To 25.8 g. (0.2 mole) of cinnamonitrile were added 100 ml. of acetic acid and 35.8 g. (0.2 mole) of p-chlorobenzenesulfenyl chloride. The mixture was heated to reflux, at which temperature it evolved hydrogen chloride continually, while the color of the reaction mixture changed from red to dark brown. After 2 hours, the mixture was cooled. Acetic acid and unreacted cinnamonitrile were removed by distillation, leaving a crude reaction mixture comprising compounds containing chlorine, cyano groups and divalent sulfur.

Example 8

This example describes the reaction of an alpha-substituted acrylonitrile with an aromatic sulfenyl halide.

For the reaction of methacrylonitrile with a halogenated aromatic sulfenyl chloride, 13.4 g. (0.2 mole) of methacrylonitrile are mixed with 100 ml. of glacial acetic acid and then to the reaction mixture is added 35.7 g. (0.2 mole) of p-chlorobenzenesulfenyl chloride. As the reaction mixture is slowly warmed to 70° C., the color of the mixture gradually lightens from deep red to clear yellow. After removal of the acetic acid and unreacted sulfenyl chloride, the adduct of the chlorobenzenesulfenyl chloride with methacrylonitrile is obtained as a distillable liquid product. The analysis of the product corresponds closely to that calculated for $C_{10}H_9Cl_2NS$, and the infrared spectrum shows a medium intensity nitrile single band. It appears that a single product is obtained; this product may be either 2-chloro-3-(4-chlorophenylthio)propionitrile or 3 - chloro - 2 - (4 - chlorophenylthio)propionitrile. This compound may be incorporated at a concentration of 0.1% in a growth medium for microorganisms, to produce control of the growth of colonies of *Micrococcus pyogenes, Salmonella typhosa,* or *Aspergillus niger* when the growth medium is inoculated therewith.

In addition to the reaction products and compounds obtained by reaction of halogenated aromatic sulfenyl halides with olefinic nitriles, this invention provides as new compounds 3-halo-2-(haloarylthio)propionitriles and 2-halo-3-(haloarylthio)propionitriles, of the general formula

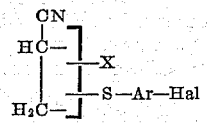

where X represents a halogen atom and Hal-Ar represents a halogenated aromatic radical. It will be understood by those skilled in the art that the two position isomers represented by the above formula may each exist in the form of two optical isomers. By the formulas and nomenclature used herein is intended to be denoted either racemic mixtures of optical isomers or the individual d- and l-isomers of the present nitriles. These compounds are adapted for the control of bacteria and fungi, especially when X represents chlorine and Hal-Ar- represents a mono-, di-, or trichlorophenyl radical. The general class of the presently provided nitriles, where Hal-Ar represents an aromatic radical containing one to two benzene rings substituted by four or more halogen atoms and X represents halogen, are additionally adapted for use as dielectrics, e.g., as insulating materials for the storage of electrostatic energy in capacitors for power line and other electric equipment. They are also useful as chemical intermediates, for the synthesis of phosphorus compounds active as biological toxicants, oil additives, etc.

It will be appreciated that, as explained above, 2-halo-3-(haloarylthio)propionitriles and 3-halo-2-(haloarylthio)propionitriles are believed to be present in the crude reaction products of acrylonitrile with halogenated aromatic sulfenyl halides, though isolation thereof has presented difficulties. The presently provided propionitriles are contemplated, not as equivalents of the presently provided acrylonitrile halogenated aromatic sulfenyl halide reaction products, but as compounds related thereto and of similar utility in certain applications.

Examples of synthesis of the 2-halo-3-(haloarylthio)propionitriles are outlined above in Example 5. In one method, a halogenated aromatic thiol is added to an α-haloacrylonitrile. α-Chloroacrylonitrile is the preferred α-haloacrylonitrile; α-bromoacrylonitrile is substantially as reactive with the present thiols, while α-iodoacrylonitrile and α-fluoroacrylonitrile are less preferred but useable alternatives. For the preparation of highly active bacteriostatic and fungistatic compounds, thiophenols substituted by from 1 to 3 chlorine atoms on the benzene ring are preferred; exemplary of such thiophenols are, for example, 2-, 3-, and 4-chlorothiophenol, 3,4- and 3,5-dichlorothiophenol, 2,4,5-trichlorothiophenol, etc. Other thiophenols useful in preparing 2-halo-3-(haloarylthio)propionitriles in accordance with this invention include other halogenated thiophenols, exemplified by 4-fluorothiophenol, 3-bromo-4-iodothiophenol, 3,4-dibromothiophenol, pentachlorothiophenol, etc., halogenated alkylthiophenols, such as 3-chloro-4-methylthiophenol, 2-chloro - 4 - methylthiophenol, 3-chloro-2,4-dimethylthiophenol, 3-chloro-4-neopentylthiophenol, etc.; and haloalkyl-substituted aromatic thiophenols such as chloromethylthiophenol, trichloromethylthiophenol, 3-chloro-4-chloromethylthiolphenol, 4-chloropropylthiophenol, etc. Additionally, for the preparation of the present 2-halo-3-(haloarylthio)propionitriles, there may be employed halogenated polycyclic aromatic thiols containing up to 2 benzene rings, such as 5-chloro-1-naphthalenethiol, 2,4,5-trichloronaphthalene-1-thiol, trichloro - 4 - biphenylthiol, hexachloro-4-biphenylthiol, etc.

For the preparation of a 2-halo-3-(haloarylthio)propionitrile by this reaction, the thiol is simply contacted with the α-haloacrylonitrile until formation of the halo (haloarylthio)propionitrile is complete. The reaction is preferably carried out in the presence of a basic catalyst, e.g., sodium metal or sodium methylate, potassium hydroxide, pyridine, a quaternary ammonium hydroxide such as benzyltrimethylammonium hydroxide, etc. Solvents and/or diluents which may be employed include benzene, hexane, dioxane, and other inert reaction media. The temperature of reaction varies with the reactivity of the reactants; generally, the reaction mixture is conveniently heated to reflux to assure completion of reaction. Pressure variation generally offers no advantages and atmospheric pressure is conveniently employed. The product is isolated by conventional methods, e.g., extraction, distillation, etc.

The synthesis is illustrated by the following examples:

Example 9

To a solution of 43.3 g. (0.3 mole) of p-chlorothiophenol in 75 ml. of dioxane containing 5 ml. of 50% aqueous choline (2-hydroxyethyltrimethylammonium hydroxide) was added 26.3 g. (0.3 mole) of α-chloroacrylonitrile. There was an immediate exothermal reaction during the addition, and the reaction mixture temperature was held at 35–40° C. by cooling. After addition was complete, the reaction mixture was stirred for ½ hour at 30–40° C., and then poured into ice water. The oil which separated was extracted with ether, dried, and the ether removed by evaporation. On distillation, there were collected 55 g. (79% yield) of 2-chloro-3-(4-chlorophenylthio)propionitrile, as a yellow liquid, b. 147–148° C./0.6 mm., $n_D^{25}$ 1.5885, analyzing correctly for $C_9H_7Cl_2NS$, and having an α-chloro structure by infrared analysis. On standing the oil solidified; a sample recrystallized from ethanol m. 39–40° C.

Example 10

Pentachlorothiophenol was reacted with α-chloroacrylonitrile in the presence of sodium methylate for 16 hours. The reaction product was extracted with aqueous alkali to remove unreacted thiophenol, and the alkali-insoluble material, dissolved in benzene, was evaporated. The first precipitate proved to be sulfur, possibly an impurity in the thiophenol, after which 2-chloro-3-(pentachlorophenylthio)propionitrile precipitated as a solid melting at about 100–105°. The mixed melting point of this compound with the pentachlorobenzenesulfenyl halide-acrylonitrile adduct of Example 6 was 83–87°, i.e., exhibited definite depression.

In the alternative synthesis of this invention for 2-halo-3-(haloarylthio)propionitriles, an alkali salt of a haloarylthiol is reacted with 2,3-dihalopropionitrile, whereby replacement of the β-halo substituent is obtained. Since the α-haloacrylonitriles are obtained from α,β-dihalopropionitriles, this reaction affords a synthesis which may be more economical than that above described, by addition of a haloarylthiol to an α-haloacrylonitrile. The presently useful alkali metal salts of haloarylthiophenols are the sodium, potassium, rubidium, cesium and lithium salts, sodium being preferred, of halogenated aromatic thiols as listed in the above paragraph; exemplary of such compounds are sodium 4-chlorothiophenate, sodium 3-bromo-4-iodothiophenate, potassium pentachlorothiophenate, sodium 3-methyl-4-chlorothiophenate, etc. The presently useful α,β-dihalopropionitriles are preferably halogenated propionitriles wherein both halogen substituents are the same, i.e., 2,3-dichloropropionitrile or 2,3-dibromopropionitrile, or where the more reactive halogen is on the beta carbon atom, as in 2-fluoro-3-bromopropionitrile.

The same 2-halo-3-(haloarylthio)propionitriles are obtained by either of the two methods outlined above. Exemplary of presently afforded 2-halo-3-(haloarylthio) propionitriles which can be obtained by either of these reactions are 2-chloro-3-(4-chlorophenylthio)propionitrile, 2 - chloro-3-(3,4-dichlorophenylthio)propionitrile, 2-chloro - 3 - (2,4,5-trichlorophenylthio)propionitrile, 2-chloro-3-(pentachlorophenylthio)propionitrile, 2-chloro-3 - (tetrachlorophenylthio)propionitrile, 2-chloro-3-(trichloronaphthylthio)propionitrile, 2 - bromo-3-(4-chlorophenylthio)propionitrile, 2-chloro-3-(4-fluorophenylthio) propionitrile, 2 - chloro-3-(3-methyl-4-chlorophenylthio) propionitrile, 2-chloro-3-(4-trichlorophenylthio)propionitrile, etc.

The 2-halo-3-(haloarylthio)propionitriles are prepared from 2,3-dihalopropionitriles and the alkali metal salts of haloarylthiols by simply contacting the reactants. The reaction takes place readily, and cooling and/or diluents may be required to moderate the reaction rate initially, while heating may be employed if desired to complete the reaction. Suitable solvents and diluents for the reaction include water, ethylene glycol dimethyl ether, dioxane, etc. Sluggishly reacting pairs of reactants may advantageously be heated together in the absence of solvents. Catalysts are unnecessary; pressure variation may be employed if desired, but generally atmospheric pressure is adequate. The products are isolated by extraction, distillation, etc.

Example 11

Sodium 4-chlorothiophenate was prepared by addition of 72 g. (0.5 mole) of 4-chlorothiophenol to an aqueous concentrated solution of sodium hydroxide. The solution was gradually added, with vigorous stirring, to a mixture of 62 g. (0.5 mole) of 2,3-dichloropropionitrile and 300 ml. of water, while the temperature was held at 35° C. by cooling. The reaction product was then extracted with ether, and the ether solution dried, the ether removed by evaporation, and the remaining product distilled. There were thus obtained 92 g. (79.5% yield) of 2-chloro-3-(4-chlorophenylthio)propionitrile, as a yellow liquid, b. 144–146° C./0.4 mm., $n_D^{25}$ 1.5898, having the analytical composition of $C_9H_7Cl_2NS$, and exhibiting the characteristic infrared spectrum of an α-chloro nitrile. Conversion to the sulfone confirmed identification of this product.

For the preparation of 3-halo-2-(haloarylthio)propionitriles, there may be employed the addition of a hydrogen halide to a 2-(haloarylthio)acrylonitrile. As noted hereinabove, (haloarylthio)-substituted acrylonitriles can be isolated from the present reaction products of acrylonitrile with halogenated aromatic sulfenyl halides, and 2-haloarylthio)acrylonitriles from this source may be employed in the preparation of 3-halo- 2-(haloarylthio)propionitriles if desired. Alternatively, the 2-(haloarylthio)acrylonitriles may be obtained by other methods, e.g., by the preparation of a 2-halo-3-(haloarylthio)propionitrile as described above, followed by pyrolytic dehydrohalogenation and rearrangement. Exemplary of presently useful 2-(haloarylthio)acrylonitriles are, e.g., mono-, di-, and trichlorophenylthio acrylonitriles such as 2-(4-chlorophenylthio)acrylonitrile, 2-(2-chlorophenylthio)acrylonitrile, 2-(2,4-dichlorophenylthio)acrylonitrile, 2-(2,4,5-trichlorophenylthio) acrylonitrile, etc. Other presently useful 2-(halogenated-phenylthio)acrylonitriles include, e.g., 2-(4-bromophenylthio)acrylonitrile, 2-(3-iodo-4-fluorophenylthio)acrylonitrile, 2-(pentachlorophenylthio)acrylonitrile, 2-(4-chloro-3-methylphenylthio)acrylonitrile, 2-(4-chloromethylphenylthio)acrylonitrile, 2-(3,5-dichloro-4-neopentylphenylthio)acrylonitrile, etc. Presently useful polycyclicarylthioacrylonitriles include, for example, 2-(chloronaphthylthio)acrylonitrile, 2-(trichlorobiphenylthio)acrylonitrile, 2-(2-cyclohexyl-4-chlorophenylthio)acrylonitrile, etc.

Exemplary of the presently afforded 3-halo-2-(halo-phenylthio)propionitriles which we contemplate as being particularly active microbiological toxicants are 3-chloro-2-(4-chlorophenylthio)propionitrile, 3-chloro-2-(3,4-dichlorophenylthio)propionitrile, 3-chloro-2-(2,4,5-trichlorophenylthio)propionitrile, etc. For the preparation of the present 3-halo-2-(haloarylthio)propionitriles generally, other halogens, i.e., bromine, iodine, or fluorine may be substituted for chlorine, but generally will be less preferable in the present application. Examples of other presently afforded halogenated compounds which are 3-halo-2-(haloarylthio)propionitriles and which may be used as biological toxicants, dielectrics, etc., are 3-chloro-2-(pentachlorophenylthio)-propionitrile, 3-chloro-2-(3-bromo-4-iodophenylthio)propionitrile, 3-chloro-2-(difluorophenylthio)propionitrile, 3-chloro-2-(2-chloro-4-ethylphenylthio)propionitrile, 3-chloro-2-(4-chloromethylphenylthio)propionitrile, 3-chloro-2-(2-chloromethylphenylthio)propionitrile, 3-chloro-2-(2,3-dichloromethyl-4-methylphenylthio)propionitrile, 3-chloro-2-(trichlorobi-phenylthio)propionitrile, etc.

For the preparation of a 3-halo-2-(haloarylthio)propionitrile by the above-discussed synthesis, a hydrogen halide, preferably hydrogen chloride, is simply added to the chosen 2-(haloarylthio)acrylonitrile. Advantageously, cooling is employed to moderate the rate of addition, and solvents or diluents, such as benzene, ethylene dichloride, chloroform, carbon tetrachloride, or dioxane, may be employed if desired. The addition of catalysts is generally unnecessary, but amines or amine salts may be used, if desired. Sub- or super-atmospheric pressures are operable, but generally atmospheric pressure is normally employed. The product is isolated by usual procedures, e.g., distillation, extraction, etc.

An illustrative operation is carried out as follows:

*Example 12*

Hydrogen chloride is slowly passed into a solution of 2-(4-chlorophenylthio)acrylonitrile in chloroform, held at 0° C. in a cooling bath, until the theoretical weight increase for formation of 3-chloro-2-(4-chlorophenyl-thio)propionitrile is attained. The product is washed with a dilute aqueous solution of sodium carbonate, and then washed with water, after which the solvent is removed by distillation, leaving 3-chloro-2-(4-chlorophenyl-thio)propionitrile as an oil, B.P. 140–150°/0.5 mm.

The compounds of the invention, obtained as reaction products of halogenated aromatic sulfenyl halides with the presently useful olefinic nitriles of the formula RCH=CRCN where R is as defined above, or obtained by the alternative synthesis of compounds of known structure

where X is halogen and Hal-Ar is a halogenated aryl radical, as outlined above, are useful for a variety of agricultural and industrial purposes, and are especially adapted for the control of microorganisms.

For use as bacteriostats and fungistats, there are particularly preferred the classes of products represented on the one hand by the reaction product of acrylonitrile with benzenesulfenyl chlorides substituted by from one to three chlorine atoms in the benzene ring, and on the other hand, by the presently provided nitriles of the formula

and

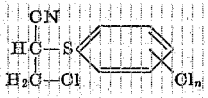

where $n$ is an integer of from 1 to 3.

*Example 13*

For the evaluation of bacteriostatic and fungistatic effect, the test chemicals were mixed in predetermined concentrations with hot, sterile agar which was subsequently poured into Petri dishes, cooled and allowed to harden. Nutrient agar containing the test compound was then inoculated with the bacteria *Micrococcus pyogenes* var. *aureus* and *Salmonella typhosa*, and Sabouraud's dextrose agar containing the test compounds was inoculated with the fungus organism *Aspergillus niger*. The plates were incubated for 48 hours at 37° C. The results are recorded in the following table, wherein a + (plus) sign indicates growth of the microorganism and a − (minus) sign, suppression of such growth; the concentrations of the test chemicals in the agar are reported in parts per million. For comparison, test data for related compounds are included.

|  | Test organism ||||||||| 
|---|---|---|---|---|---|---|---|---|
|  | M. pyogenes ||| S. typhosa ||| A. niger |||
| Concn, p.p.m. | 100 | 10 | 1 | 100 | 10 | 1 | 100 | 10 | 1 |
| Test compound: | | | | | | | | | |
| I. R.p. of p-ClC$_6$H$_4$SCl and acrylonitrile | − | − | − | − | − | − | − | − | − |
| II. p-ClC$_6$H$_4$SCH$_2$CHClCN | − | − | + | − | − | + | − | − | + |
| ClC$_6$H$_4$SCH$_2$CH$_2$CN | + | + | + | + | + | + | + | + | + |
| C$_6$H$_4$CH$_2$CHClCN | + | + | + | + | + | + | + | + | + |
| R.p. of p-ClC$_6$H$_4$SCl and CH$_2$=CHCOO(2-ethyl-hexyl) | + | + | + | + | + | + | + | + | + |

(R.p.=reaction product.)

It will be seen that the reaction product of chlorobenzenesulfenyl chloride and acrylonitrile (I) is a potent bacteriostat and fungistat, as is also, though to a somewhat lesser degree, the 2-chloro-3-(4-chlorophenylthio)-propionitrile (II) obtained by addition of chlorothiophenol to α-chloroacrylonitrile. On the other hand, it is shown that haloarylthio-propionitriles are not generally bacteriostatic, nor are (aryl)(halo)propionitriles, nor is the reaction product of chlorobenzenesulfenyl chloride and a higher acrylate ester.

The reaction product of pentachlorobenzenesulfenyl chloride with acrylonitrile inhibits Micrococcus pyogenes at down to 1 part per million, and inhibits Salmonella typhosa growth at 100 parts per million, whereas the adduct of pentachlorothiophenol with acrylonitrile, which is 3-(pentachlorophenylthio)propionitrile, is not inhibitory of either of these organisms at such concentrations and, in fact, fails to inhibit M. pyogenes at concentrations up to 100 parts per million.

*Example 14*

In accordance with this invention, there are employed with particular effectiveness as bacteriostats and fungistats the presently provided reaction products of acrylonitrile with benzenesulfenyl chlorides wherein the benzene ring is substituted by from one to three chlorine atoms.

To illustrate the wide field of usage of the present bacteriostats and fungistats, there is appended below a table showing minimum concentrations of the reaction product of acrylonitrile and p-chlorobenzenesulfenyl chloride inhibiting growth of various test organisms.

| Bacteriostatic test organism | Lowest p.p.m. inhibiting growth | Fungistatic test organism | Lowest p.p.m. inhibiting growth |
|---|---|---|---|
| Micrococcus pyogenes var. aureus ATCC 6538 (g. +). | 1 | Penicillium expansum IPC 126. | 1 |
| Streptococcus faecalis ATCC 9790 (g.+). | 100 | Agrophytes ATCC 9129. | 1 |
| Bacillus cereus var. mycoides IPC 509 (g.+). | 10 | Fomes annosus FPL 517. | 1 |
| Corynebacterium diphtheriae ATCC 296 (g. +). | 10 | Hormiscium gelatinosum FPL. | 1 |
| Bacterium ammoniagenes ATCC 6871 (g. +). | 10 | Trichoderma sp. T-1 ATCC 9645. | 10 |
| Mycobacterium phlei (St. Louis) ("acid fast"). | 10 | Chaetomium globosum USDA 1032.4. | 1 |
| Bacillus subtilis (Lambert) (g.+). | 1 | Ceratostomella pilifera ATCC 8713. | 1 |
| Escherichia coli ATCC 11229 (g—). | 10 | Aspergillus oryzae ATCC 10196. | 10 |
| Aerobacter aerogenes IPC 500 (g.—). | 10 | Cladosporium herbarum ATCC 6506. | 1 |
| Erwinia atroseptica ATCC 7404 (g.—). | 100 | Alternaria tenuis ATCC 11612. | 1 |
| Proteus vulgaris (Lambert) (g.—). | 10 | Myrothecium verrucaria ATCC 9095. | 10 |
| | | Stemphylium sarcinaeforme (U. of Ill.). | 1 |
| | | Monolinia fructicola (U. of Ill.). | 1 |

Parts per million (p.p.m.) tested: 1000, 100, 10, 1.

As mentioned above, the present reaction products are also effective as soap bacteriostats, being inhibitory to the growth of various skin bacteria. It is known that soap quenches the activity of many bacteriostats and fungistats, so that this activity of the present compounds in the presence of soap is surprising and very valuable. To determine the activity of a compound in the presence of soap, a weighed sample of the test compound is dissolved in acetone, portions of the acetone solution are dispersed in stock soap solutions, and the soap solution containing the test compound is incorporated into hot, sterile nutrient agar and into Sabouraud's dextrose agar to give predetermined concentrations of soap and test chemical. The liquid agar is poured into Petri dishes, cooled and allowed to harden and then inoculated with the test bacteria and fungi.

In the following table are recorded the lowest concentration (parts per million) of the reaction product of acrylonitrile and p-chlorobenzenesulfenyl chloride inhibiting the growth of the test organisms in this test.

| Test Organism | Lowest Inhibitory Concentration, p.p.m. |
|---|---|
| Micrococcus pyogenes var. aureus | 2 |
| Salmonella typhosa | 20 |
| Pseudomonas aeruginosa | 200 |
| Aspergillus niger | 2 |
| Tricophyton mentagrophytes | 20 |

The present microbiological toxicant products are particularly useful for the prevention and the control of bacterial infection and of decomposition and decay caused by mildew, molds, and other non-chlorophyll-containing plants. Thus, e.g., the present products may be used for the protection of organic materials subject to deterioration by rotting, such as leather, fur, pulp and paper, textiles, rope, rubber latex, plastics, and paint. The incorporation of protective fungistats in such organic materials is especially desirable when they are exposed to conditions favoring mycological growth. Thus, e.g., the present microbiological toxicants may be used to protect wood buried in ground, as in the case of railroad ties and telephone poles; textiles exposed to damp, as under tropical conditions or in the case of lawn furniture, awnings, etc.; and they may be used in marine paints and lacquers subject to algal and fungal attack, etc. The present products may also be used as seed protectants and soil sterilants for the suppression of organisms harmful to seeds and plants. Additionally, they are of utility as oil flood injection water additives, for suppression of sulfate-reducing bacteria causing pipe plugging, such as *Desulfovibrio desulfuricans*.

The microbiological toxicants of this invention also have a high degree of germicidal activity, and compositions containing these products are disinfectants. Disinfectant compositions containing the present products may be used in the disinfection or sterilization of surgical instruments, dairy equipment, eating utensils, and other articles requiring such treatment, or in sanitary cleaning solutions employed to wash walls, floors, etc. When employed in the manufacture of pharmaceutical, cosmetic, or edible compositions, the present microbiological toxicants may have both preservative and antiseptic effects.

The nitrile products of the invention may be applied directly to the material to be treated, e.g., by incorporation of the bacteriostatic and fungistatic nitrile in a disinfectant soap or an antiseptic cream. However, because the present products are effective in extremely dilute concentrations, for most applications it is preferred to incorporate them in a carrier or diluent. The choice of diluent is determined by the use of the compositions, as is the concentration of the active ingredient in the diluent. Thus, by admixture with an inert pulverulent carrier, such as talc, bentonite, kieselguhr, diatomaceous earth, etc., there may be prepared compositions suitable for admixture with seeds, etc., to afford protection from microbiological attack in the soil. Solutions of the compounds in organic solvents such as kerosene may be applied as a spray or impregnating bath, if desired with the use of pressure to facilitate penetration of the solution, for treatment of cellulosic materials to produce, e.g., rot-proofing. Suitable formulations for application of the present nitrile products to articles subject to microbiological attack are also prepared by mixing the nitrile with an emulsifying agent, suitably in the presence of organic solvents, and then diluting with water to form an aqueous emulsion containing the nitrile. Suitable emulsifying agents include, e.g., alkylbenzenesulfonates, polyalkylene glycols, salts of sulfated long-chain alcohols, sorbitan fatty acid esters, etc.; other emulsifying agents which may be used to formulate emulsions of the present compounds are listed, e.g., in the U.S. Department of Agriculture Bulletin No. E607. Aqueous emulsions of the microbiological toxicant products of the invention are also particularly suited for use as disinfectant solutions, e.g., to wash floors and walls or to rinse restaurant ware, etc. In another embodiment of this invention, standard paint formulations may be used as a diluent and carrier for the microbiological toxicant compounds of the invention; the nitrile product may assist in preventing mold growth in, e.g., casein paints, and the paints may also be applied to surfaces which are thereby rendered resistant to the growth of lower organisms. The microbiological toxicants may also be mixed with carriers which are active of themselves, for example, with hormones, with buffering and/or softening agents, etc.

Besides providing the novel method of inhibiting the growth of microorganisms which comprises the utilization of the products of this invention and particularly certain acrylonitrile reaction products and chloro(chlorophenylthio)propionitriles as described above, this invention concerns the provision of reaction products of a variety of olefinic nitriles and halogenated aromatic sulfenyl halides as defined above, and of new 3-halo-2-(haloarylthio) and 2-halo-3-(haloarylthio)propionitriles, as new and useful compounds and compositions. Illustrative of uses which we contemplate for the novel products of this invention is their use as a toxicant to organisms of higher order than the bacteria and fungi, i.e., nematodes, plants, etc.

The following examples illustrate some of the applications as agricultural toxicants which we contemplate for the class of reaction products of halogenated aromatic sulfenyl halides with olefinic nitriles provided by this invention.

*Example 15*

The reaction product of acrylonitrile with chlorobenzenesulfenyl chloride was incorporated into soil infested with root-knot nematodes, Meloidogyne spp., to produce a concentration of 0.01% by weight of the nitrile in the soil. A two-week old tomato plant was then potted in the treated soil and the assembly was held in a greenhouse under standard conditions for two months. Whereas a control plant grown under parallel conditions, in soil similarly infected but not treated with the nitrile, was badly damaged by root-knot nematode attack at the end of this period, the tomato plant grown in the soil treated with the reaction product was completely free of nematode infestation, nor was there any evidence of phytotoxicity of the nitrile to the plant at this concentration.

For the control of nematode infestation in soils or other plant growth media, the present reaction products may be incorporated directly into the soil or compositions containing an inert carrier and the nitrile as the active ingredient may be employed. Suitable compositions comprise dusts, organic solutions and aqueous emulsions, etc., as described hereinabove. The present toxic products of reaction of olefinic nitriles with sulfenyl halides which possess antifungal, antibacterial, and antinematode activity may serve as general soil sterilants. They may also be utilized to combat helminths infesting farm animals, etc.

It has also been found that products of the invention are active herbicides.

*Example 16*

Aluminum pans containing soil planted with seeds of representative grass and broad-leaf plant species were sprayed with acetone solutions of the reaction products of acrylonitrile and p-chlorobenzenesulfenyl chloride at rates equivalent to 25 and 10 lbs. per acre. The treated pans were held in a greenhouse under standard moisture and temperature conditions for ten days, and then observed to determine emergence of the seedlings and effect of the nitrile on the plant growth. It was found that at both 10 and 25 lbs. per acre, emergence of moss rose and sugar beet seeds was substantially completely suppressed; while at 25 lbs, per acre, essentially complete suppression of the germination of seeds of radish and red clover was obtained, and the cucumber seedlings which emerged were abnormal. The grasses at 25 lbs. per acre were severely twisted and mostly dying, while at 10 lbs. per acre, germination of brome grass was completely inhibited.

The related compound, 3-(chlorophenylthio)propionitrile, on the other hand, is completely without pre-emergent herbicidal effect at 10 lbs. per acre.

*Example 17*

Ten-day to two-week old specimens of various grasses and broad-leaf plants and two bean plants having one mature trifoliate and one partly-opened trifoliate were sprayed with an emulsion of the acrylonitrile p-chlorobenzenesulfenyl chloride reaction product at rates equivalent to 9 and to 3.6 lbs. of active chemical per acre. The emulsions were prepared by dissolving the nitrile in acetone and adding thereto a small quantity of an emulsifying agent known as "Emulsifier L" and reputed to be a mixture of a polyalkyleneglycol derivative and an alkylbenzenesulfonate. This emulsifiable concentrate was then diluted with water to form 0.5% and 0.2% emulsions of the nitrile, which were sprayed on the plants as described above. After two weeks, the plants were observed; it was found that all of the grasses and broad-leaf plants sprayed with the nitrile solution at a rate of 9 lbs. per acre were dead and the bean plant was severely damaged and exhibited formative action. In the pan sprayed at a rate of 3.6 lbs. per acre, also, a number of the plants were dead and the rest badly injured.

Other of the presently provided products which may be used as herbicides include the reaction product of 2,4-dichlorobenzenesulfenyl chloride with acrylonitrile, the reaction product of a trichlorobenzenesulfenyl chloride with acrylonitrile, the reaction product of 2,4-dichlorobenzenesulfenyl bromide with cinnamonitrile, etc.

In utilizing the present nitriles as herbicides, because of the very active nature of these compounds, the active nitrile is preferably incorporated with an inert carrier to form a herbicidal composition. Compositions which may be employed as herbicides include dusts, solutions, and emulsions containing the nitrile. These compositions may be formulated as described hereinabove. To provide good adhesion to the plants sprayed, if desired, such compositions may include adhesives or sticking agents, etc. Effective herbicidal rates depend on the species to be controlled, the formulation employed, the active ingredient of the composition, etc., and may vary from 1 lb. or less to 50 or more pounds per acre. Higher rates are suitable, e.g., for complete sterilization of the ground, for example, on railway embankments, irrigation canal banks, etc., where complete suppression of vegetative growth is desired. Lower concentrations may be used to weed out land to be prepared for planting, etc.

*Example 14*

It has further been established that the reaction product of pentachlorobenzenesulfenyl chloride with acrylonitrile, which is also effective at higher rates, on the order of 25 lbs. per acre, as a post-emergent foliage herbicide, is additionally of utility as an agricultural fungicide, at subphytotoxic rates. Thus, e.g., when two-week seedlings infected with *Puccinia rubigovera tritici*, a causal agent of wheat rust, was applied a solution containing 5000 parts per million of the reaction product of pentachlorobenzenesulfenyl chloride and acrylonitrile, the seedlings were substantially protected from effects of the rust organism. Tomato seedlings immersed in a solution containing 100 parts per million of this reaction product and subsequently exposed to the organism *Fusarium lycopersici*, failed to develop the tomato wilt disease caused by this pathogen, whereas control plants were badly infected within a period of two weeks.

It is further contemplated that the presently provided sulfur-containing reaction products [e.g., adducts of α,β-olefinic nitriles with halogenated aromatic sulfenyl halides, and generally halo(haloarylthio)alkanenitriles obtained as described above] can be oxidized (e.g., with hydrogen peroxide in acetic acid, potassium permanganate, chromic acid, etc.) to provide the corresponding sulfoxide and sulfone derivatives. The utility of certain of these oxidized reaction products as biological toxicants (bacteristats, fungistats, etc.) has been established.

While the invention has been described with reference to particular preferred embodiments thereof, modification and variations of the present invention will be obvious to those skilled in the art and are intended to be included in the scope of the present claims.

What is claimed is:

1. The method of inhibiting the growth of undesired microorganisms which comprises exposing said microorganisms to a toxic amount of a compound of the formula

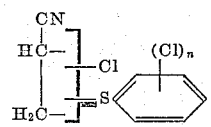

where $n$ is an integer from 1 to 5.

2. The method of inhibiting the growth of undesired microorganisms which comprises exposing said microorganisms to a toxic amount of a compound of the formula

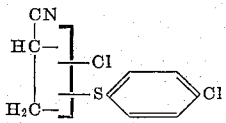

3. The method of inhibiting the growth of undesired microorganisms which comprises exposing said microorganisms to a toxic amount of a compound of the formula

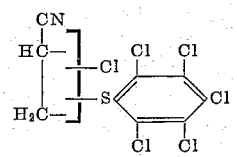

4. A biological toxicant composition comprising an aqueous emulsion and as the essential effective ingredient, a pesticidally effective amount of a compound of the formula

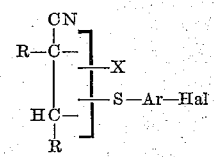

where R is selected from the class consisting of hydrogen and hydrocarbon radicals free of aliphatic unsaturation and containing from 1 to 6 carbon atoms, provided that at least one R represents hydrogen, X represents halogen, and Hal-Ar represents a halogenated aromatic radical attached to the sulfur atom by a nuclear carbon atom and containing from up to 2 benzene rings.

5. A biological toxicant composition comprising an aqueous emulsion and as the essential effective ingredient, a pesticidally effective amount of a compound of the formula

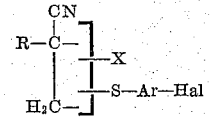

where R is selected from the class consisting of hydrogen and hydrocarbon radicals free of aliphatic unsaturation and containing from 1 to 6 carbon atoms, X represents chlorine, and Hal-Ar represents a chlorinated phenyl radical.

6. A soap bacteriostatic toxicant comprising soap and as the essential effective ingredient a bacteriostatically effective amount of a compound of the formula

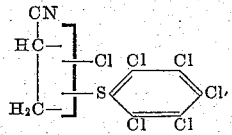

7. Haloarylthio-substituted haloalkenenitriles of the formula

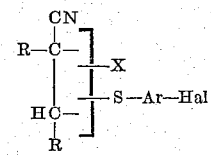

where R is selected from the class consisting of hydrogen and hydrocarbon radicals free of aliphatic unsaturation and containing from 1 to 6 carbon atoms, provided that at least one R represents hydrogen, X represents halogen, and Hal-Ar represents a halogenated aromatic radical attached to a sulfur atom by a nuclear carbon atom and containing up to 2 benzene rings.

8. Haloarylthio-substituted haloalkanenitriles of the formula

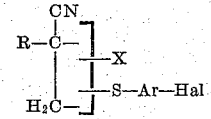

where R is selected from the class consisting of hydrogen and hydrocarbon radicals free of aliphatic unsaturation and containing from 1 to 6 carbon atoms, X represents halogen, and Hal-Ar represents a halogenated aromatic radical attached to the sulfur atom by a nuclear carbon atom and containing up to 2 benzene rings.

9. The compounds of claim 8, where R represents hydrogen.

10. The haloalkanenitriles of claim 9, wherein X is a chlorine atom and Hal-Ar is a chlorinated phenyl radical.

11. The haloalkanenitriles of claim 10, wherein Hal-Ar is the p-chlorophenyl radical.

12. The haloalkanenitriles of claim 10, wherein Hal-Ar is a pentachlorophenyl radical.

13. The method which comprises contacting an olefinic nitrile of the formula RCH=CRCN where each R represents a substituent selected from the class consisting of hydrogen and hydrocarbon radicals free of aliphatic unsaturation and containing from 1 to 6 carbon atoms, provided that at least one R represents hydrogen, with a halogenated aromatic sulfenyl halide of the formula Hal-Ar-SX where X represents halogen and Hal-Ar represents a halogenated aromatic radical attached to a sulfur atom by a nuclear carbon atom and containing up to 2 benzene rings, and thereby forming a product comprising haloarylthiosubstituted haloalkanenitriles of the formula

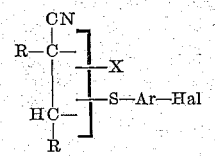

where X, R and Ar-Hal are as defined hereinabove.

14. The method of claim 13 wherein said olefinic nitrile is of the formula RCH=CHCN, where R represents a hydrocarbon radical free of aliphatic unsaturation and containing from 1 to 6 carbon atoms.

15. The method of claim 13 where said olefinic nitrile is of the formula $CH_2=CRCN$, where R represents a hydrocarbon radical free of aliphatic unsaturation and containing from 1 to 6 carbon atoms.

16. The method of claim 13 where said olefinic nitrile is acrylonitrile.

17. The method of claim 13 where said olefinic nitrile is acrylonitrile and said sulfenyl halide is a chlorinated monocyclic aromatic sulfenyl chloride.

18. The method of claim 13 where said olefinic nitrile is acrylonitrile and said sulfenyl halide is a benzenesulfenyl chloride wherein the benzene ring of said sulfenyl chloride is substituted by from 1 to 3 chlorine atoms.

19. The method of claim 13 wherein said olefinic nitrile is acrylonitrile and said sulfenyl halide is p-chlorobenzenesulfenyl chloride.

20. The method of claim 13 wherein said olefinic nitrile is acrylonitrile and said sulfenyl halide is pentachlorobenzenesulfenyl chloride.

References Cited in the file of this patent

UNITED STATES PATENTS

| | | |
|---|---|---|
| 2,497,060 | Buc | Feb. 14, 1950 |
| 2,645,592 | Campbell | July 14, 1953 |
| 2,725,411 | Ladd et al. | Nov. 29, 1955 |
| 2,743,210 | Jones et al. | Apr. 24, 1956 |
| 2,788,360 | Westfahl | Apr. 9, 1957 |

OTHER REFERENCES

Brintzinger et al.: "Angew. Chemie," vol. 64, p. 398, 1952.